(12) United States Patent
Yang et al.

(10) Patent No.: US 11,835,393 B2
(45) Date of Patent: Dec. 5, 2023

(54) MICROPROBE

(71) Applicants: Lan Yang, St. Louis, MO (US);
Fang-Jie Shu, St. Louis, MO (US);
Xuefeng Jiang, St. Louis, MO (US);
Guangming Zhao, St. Louis, MO (US)

(72) Inventors: Lan Yang, St. Louis, MO (US);
Fang-Jie Shu, St. Louis, MO (US);
Xuefeng Jiang, St. Louis, MO (US);
Guangming Zhao, St. Louis, MO (US)

(73) Assignee: Washington University, St. Louis, MO (US)

( * ) Notice: Subject to any disclaimer, the term of this patent is extended or adjusted under 35 U.S.C. 154(b) by 1363 days.

(21) Appl. No.: 16/216,995

(22) Filed: Dec. 11, 2018

(65) Prior Publication Data

US 2019/0257698 A1  Aug. 22, 2019

Related U.S. Application Data

(60) Provisional application No. 62/632,064, filed on Feb. 19, 2018.

(51) Int. Cl.

| | |
|---|---|
| *G01K 11/32* | (2021.01) |
| *G02B 1/04* | (2006.01) |
| *G01K 11/26* | (2006.01) |
| *G02B 6/02* | (2006.01) |
| *G01K 11/00* | (2006.01) |
| *B82Y 20/00* | (2011.01) |
| *G02B 6/32* | (2006.01) |

(52) U.S. Cl.
CPC ............. *G01K 11/32* (2013.01); *G01K 11/00* (2013.01); *G01K 11/26* (2013.01); *G02B 1/04* (2013.01); *G02B 6/32* (2013.01); *B82Y 20/00* (2013.01)

(58) Field of Classification Search
CPC ........ G01K 11/32; G01K 11/00; G01K 11/26; G02B 1/04; G02B 6/32; G02B 6/262; B82Y 20/00
See application file for complete search history.

(56) References Cited

U.S. PATENT DOCUMENTS 6,490,039 B2   12/2002  Maleki et al.
2005/0063444 A1*  3/2005  Frick .................. G01D 5/35341
                                                           372/92

(Continued)

FOREIGN PATENT DOCUMENTS

CN        107796532 A      3/2018

OTHER PUBLICATIONS

Single Wavelength Graded-Index (GRIN) Lenses https://www.thorlabs.com/newgrouppage9.cfm?objectgroup_id=1209#:~:text=GRIN%20lenses%20are%20generally%20used,detector%2C%20or%20collimating%20laser%20light. (Year: 2016).*

(Continued)

*Primary Examiner* — Brandi N Hopkins
*Assistant Examiner* — Janice M Soto
(74) *Attorney, Agent, or Firm* — Armstrong Teasdale LLP

(57) ABSTRACT

A microprobe is provided that includes a microsphere optical resonator operatively coupled to a nanoscatterer. The microsphere optical resonator includes a back surface and a front surface opposite the front surface. The front surface is configured to receive a focused laser beam, and the nanoscatterer is positioned adjacent to the back surface.

20 Claims, 7 Drawing Sheets

(56) References Cited

U.S. PATENT DOCUMENTS

2007/0284041 A1* 12/2007 Iida .................. C09J 133/068
      385/53
2010/0158439 A1   6/2010 Koch et al.

OTHER PUBLICATIONS

Liu, Y-C et al., "Cavity-QED treatment of scattering-induced free-space excitation and collection in high-Q whispering-gallery microcavities," Physical Review A, 85(1): 013843-1 to 013843-9 (2012).

Song, Q et al., "Highly directional output from long-lived resonances in optical microcavity," Optics Letters, 36(2): 103-105 (2011).

Zhu, J et al., "Interfacing whispering-gallery microresonators and free space light with cavity enhanced Rayleigh scattering," Science Reports, 4:6396, 7 pages (2014).

* cited by examiner

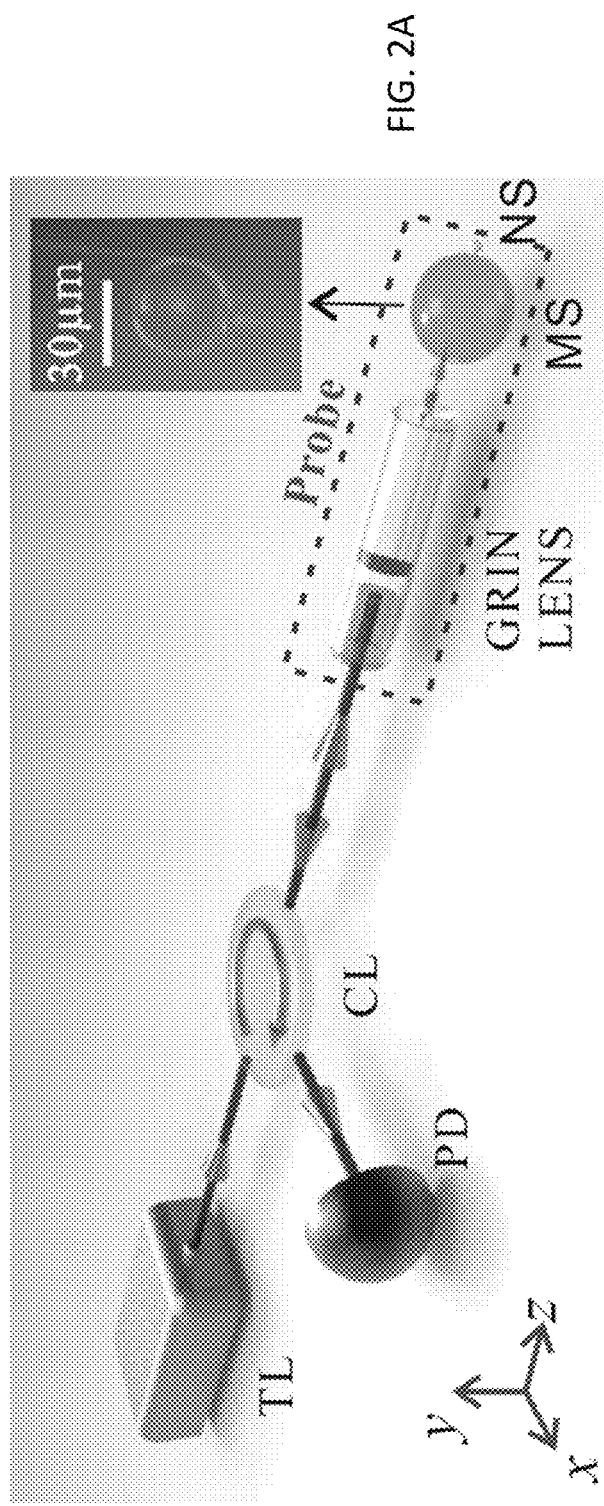
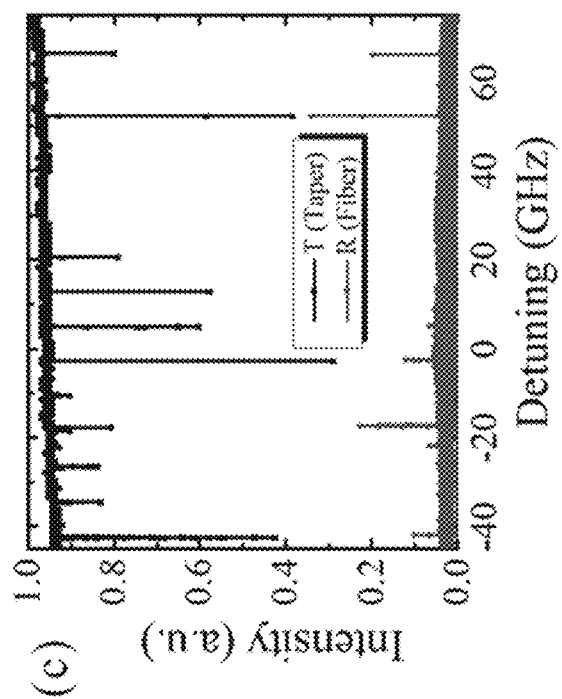
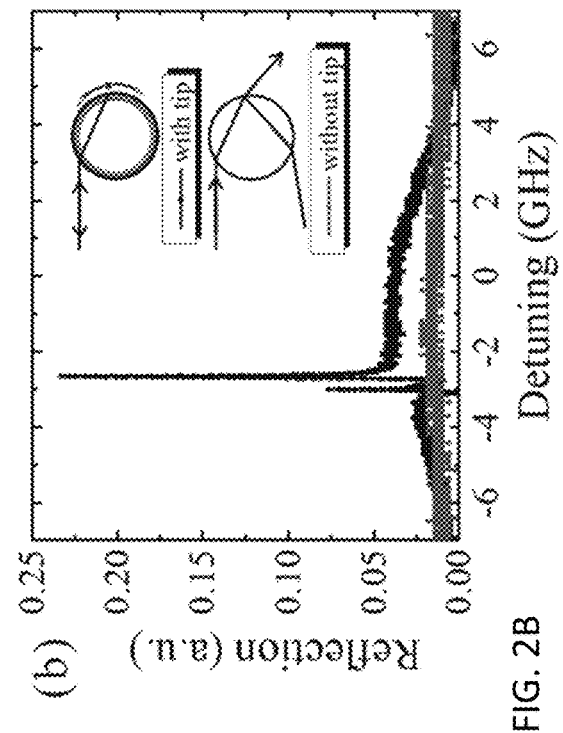
FIG. 2A
FIG. 2B
FIG. 2C

MICROPROBE

CROSS-REFERENCE TO RELATED APPLICATIONS

This application claims the benefit of U.S. Provisional Application Ser. No. 62/632,064, filed Feb. 19, 2018, entitled "SENSOR," which is hereby incorporated in its entirety herein.

STATEMENT REGARDING FEDERALLY SPONSORED RESEARCH OR DEVELOPMENT

This invention was made with government support under grant number W911NF-12-1-0026 awarded by Army Research Office. The government has certain rights in the invention.

BACKGROUND

Whispering gallery mode (WGM) microresonators have attracted increasing attentions due to their intense light confinements originating from ultrahigh quality (Q) factors and small mode volumes. Light should be effectively coupled into and out of the microresonator in applications. One or more couplers are used to couple light into the microcavity, and extract information from the microcavity. Traditionally, a near-field coupler, e.g., an integrated waveguide or a tapered fiber, within the evanescent field of the resonant mode, is used to couple light into and out of the WGM microresonator. The conventional couplers include optical fiber taper, prism, optical waveguide, angle-polished fiber, and photonic crystal fiber, and achieve coupling by near-field mode overlapping. However, to meet the needed coupling efficiency, the evanescent field coupling method requires not only the strict phase-matching condition, but also a high-resolution lithography to define the wavelength-scale waveguide-resonator gap or a high-precision alignment of the fiber taper. These near-field couplers typically possess a short coupling gap, on the order of the probe laser wavelength. The coupling strength coupling decreases exponentially with the distance, and causes the coupling signal susceptible to minor vibrations. As a result, a complex feedback control system and/or package are used to maintain the coupling stability. Further, cantilever-type evanescent field coupler, such as a fiber taper, suffers from the mechanical vibration, which gives rise to the instability of the coupling as well as loss of energy storage in the resonator.

Another approach is to tailor the cavity geometry to achieve a directional output, and the cavity modes can be time-reversely excited by a free-space laser beam. Although some designs have produced a unidirectional emission with a relatively small divergence angle and achieved the free-space coupling, the coupling efficiency is much lower than the nearfield coupler, especially for the ultrahigh Q factor modes. In addition, each cavity material having a different refractive index requires a particular cavity shape design, making the microresonator inconvenient to operate.

BRIEF DESCRIPTION

In one aspect, a microprobe is provided that includes a microsphere optical resonator operatively coupled to a nanoscatterer. The microsphere optical resonator includes a back surface and a front surface opposite the front surface. The front surface is configured to receive a focused laser beam, and the nanoscatterer is positioned adjacent to the back surface.

In another aspect, a thermal microprobe is provided that includes a microsphere optical resonator operatively coupled to a nanoscatterer. The microsphere optical resonator includes a back surface and a front surface opposite the back surface. The front surface is configured to receive a focused laser beam, and the nanoscatterer is positioned adjacent to the back surface.

In an additional aspect, a method for measuring a temperature using a thermal microprobe is provided. The method includes providing the thermal microprobe. The thermal microprobe includes a microsphere optical resonator operatively coupled to a nanoscatterer, a focusing lens operatively coupled to the microsphere optical resonator, and an optical fiber comprising a first end and a second end, the first end operatively coupled to the focusing lens. The method further includes directing a laser beam into the second end of the optical fiber, producing a focused laser beam by directing the laser beam from the first end of the optical fiber to the focusing lens, directing the focused laser beam into the microsphere optical resonator using the focusing lens, and collecting a reflection signal from the microsphere optical resonator using the optical fiber. The method additionally includes determining a resonant frequency of the microsphere optical resonator based on a frequency of the laser beam at which the reflection signal is a maximum. The resonant frequency is indicative of the temperature.

BRIEF DESCRIPTION OF THE DRAWINGS

The drawings described below illustrate various aspects of the disclosure.

FIG. 2A is another example probe system.

FIG. 2B is reflection spectra with and without a nanotip.

FIG. 2C is optical spectra of the scatterer-assisted coupling and the fiber taper coupling.

DETAILED DESCRIPTION

The present disclosure is based, at least in part, on the discovery that a novel fiber-based sensing probe can achieve far-field coupling of WGMs by scattering the focused laser beam through a nanotip. A coupling method includes scattering the free-space laser beam into resonant modes by an extra defect/scatterer placed inside the mode field. This coupling method is free from the phase-matching condition and suitable for resonators with different materials. Efficient far-field light coupling between a conventional single-mode optical fiber and high-Q WGMs is realized via a scatterer placed on the surface of a microsphere resonator. Both input and output light signals are transmitted along the same optical fiber. In various embodiments, a nanotip mounted on a 3-axis nano-stage is used as a light scatterer, so its position on the resonator may be adjusted. A graded-index (GRIN) lens coupled with a single mode fiber may be used to focus the laser beam in 1,550 nm wavelength band onto the nanotip, which then scatters the focused laser into WGMs with a coupling efficiency as high as 16.8%. The reflection signal is also collected by the same lens and fiber, which makes the whole coupling system suitable for use as a fiber-based WGM microprobe.

In various embodiments, a high-sensitivity optical fiber thermal probe with an optical microsphere is used as a microcavity sensor. The probe operates using nanoscattering and microsphere focus. The probe may further comprise a gradient index lens and a WGM fiber sensing probe. With this configuration, the coupling efficiency of the probe may be improved.

Figure 1A:
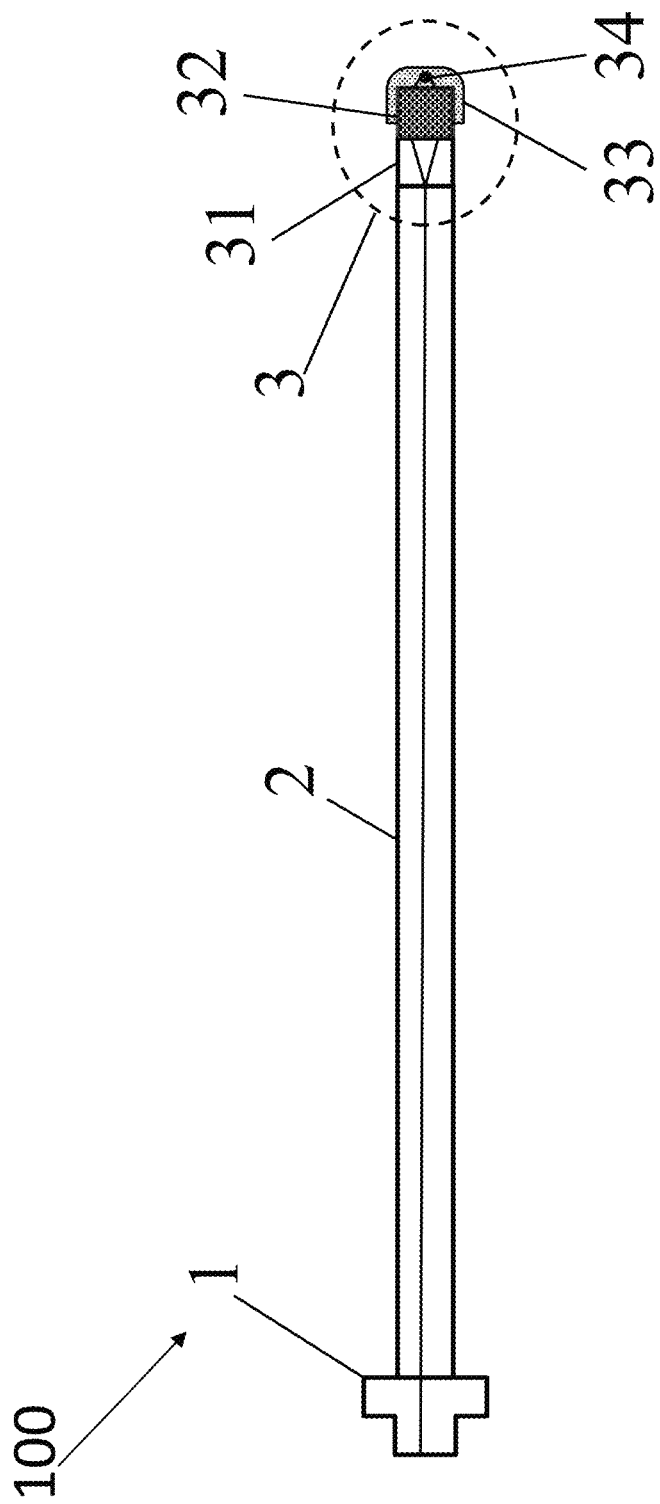
FIG. 1A is a schematic diagram of the structure of an example probe system.

FIG. 1A shows an example fiber-based sensing probe or probe system 100. A probe system comprises a fiber coupler 1, a fiber or an optical fiber 2, and a coupling system or probe 3. The optical fiber may be a single mode fiber. The optical fiber comprises a first end and a second end opposite the first end. The optical fiber connector may couple to the optical fiber at the first end of the optical fiber. The probe may couple to the optical fiber at the second of the optical fiber.

Figure 1B:
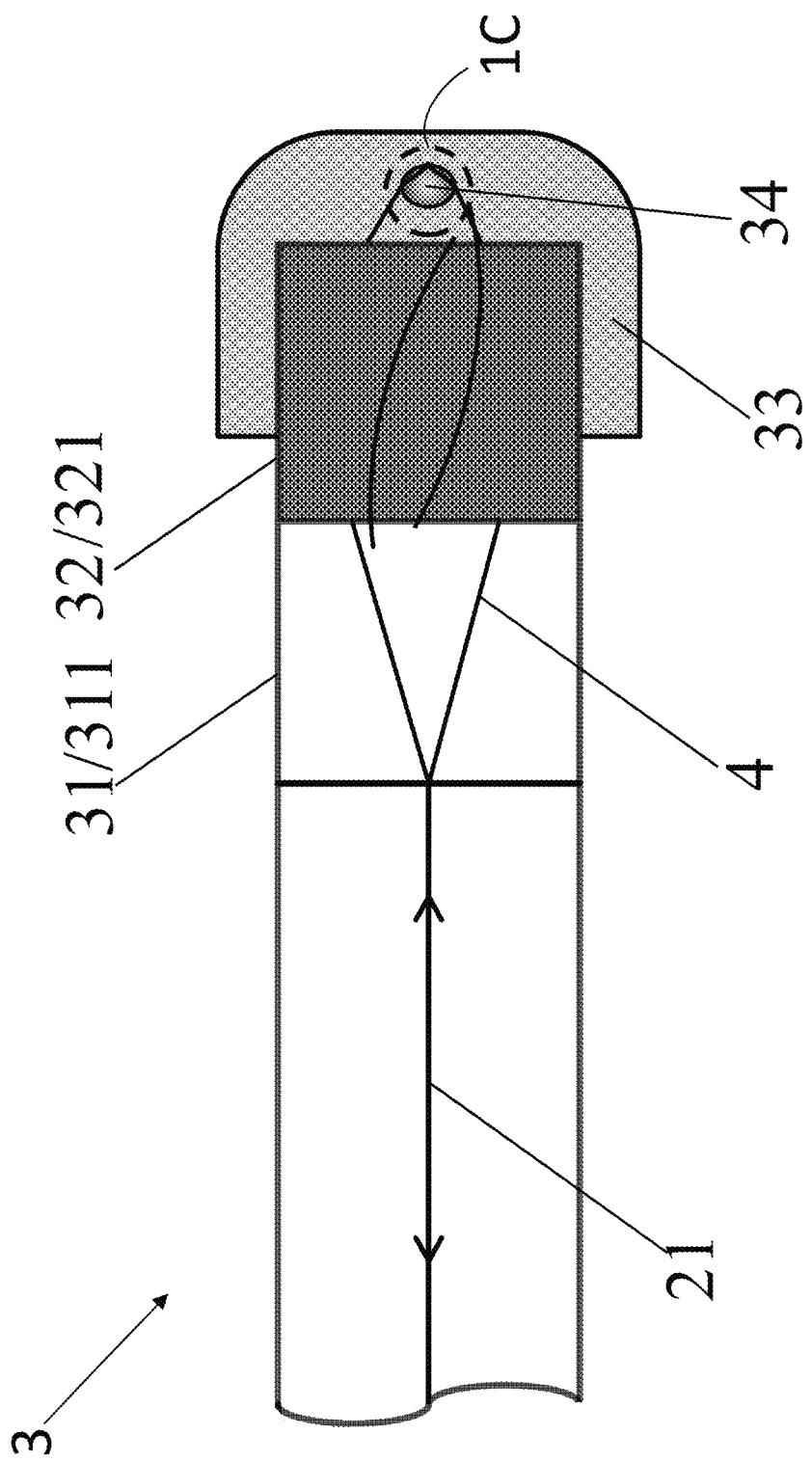
FIG. 1B is an enlarged view of the probe shown in FIG. 1A.
Figure 1C:
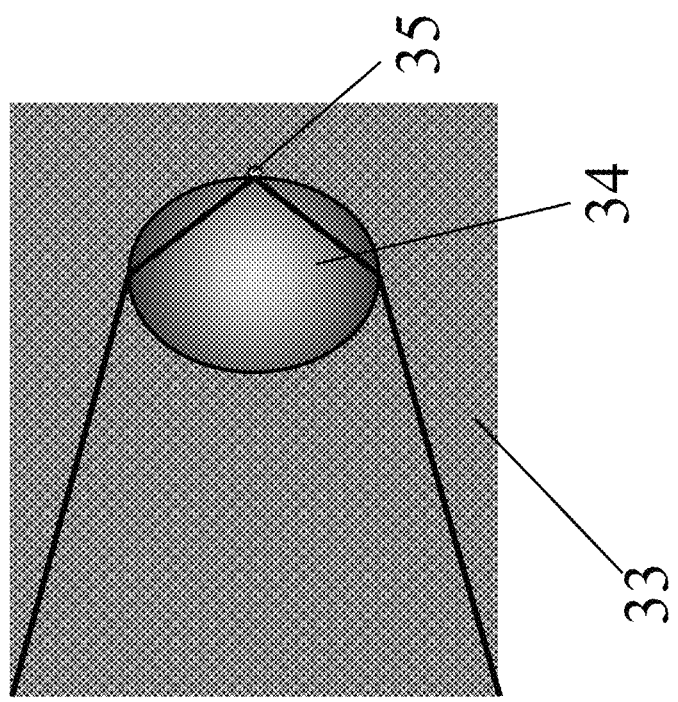
FIG. 1C is an enlarged view of section 1C shown in FIG. 1B.

The probe 3 may comprise a beam expander, light beam expanding system, beam expansion apparatus, and/or beam expanding device 31. FIG. 1B is an enlarged view of probe 3. The beam expander 31 may be positioned over the optical fiber or may comprise part of the fiber. The probe 3 may further comprise a focusing lens 32. The beam expander 31 is coupled with a focusing lens 32. The probe 3 may further comprise a microsphere or an optical microsphere resonator 34. The microsphere 34 may be optically coupled with a probe end 33. The probe end 33 may include low refractive-index optical glue to affix the elements of the probe 3 in a fixed spatial arrangement. As shown in FIG. 1C, the focused probe light may be further focused on a nanoparticle, nanoscatterer, or scattering point 35 by the microsphere 34. The nanoparticle may be a polystyrene (PS) nanoparticle. With the Purcell effect, a WGM excitation efficiency as high as 16.8% has been achieved. Due to the reversibility of light, the WGM signal can also be scattered by the same nanoparticle, and collected by the same fiber coupler.

A microsphere may be positioned at the front side of the focusing lens at the focal point of the focusing lens. Laser beams may be focused onto the front surface of the microsphere using the focusing lens. The microsphere may be positioned at the front side of the beam expander. The microsphere may further comprise a nanoscatterer positioned adjacent to the back surface of the optical microsphere opposite the front surface of the microsphere.

The nanoscatterer may include, but is not limited to, a point defect in the microsphere or a nanoparticle. The nanoscatterer scatters light focused on it by the microparticle. Because of Purcell effect, most or at least a majority of the scattering light may couple into the WGM when the incident light frequency of the scattered light matches with the resonant frequency of the WGM.

In various embodiments, both the microsphere and the nanoscatterer are affixed using a glue including, but not limited to, a low-refractive index optical glue. The combination of the focusing lens 32, the beam expander 31, and the nanoscatterer 35 on the microspheres enables bidirectional coupling of the optical energy between the transmitting fiber and the microsphere.

In some aspects, the microsphere may be made of silica. The refractive index of the microsphere may be a function of temperature in some aspects. Resonant WGMs are formed along the surface of the microsphere. The optical quality factor of the WGM is ultrahigh in some aspects, due to the extremely low optical loss of the WGM. In various embodiments, the energy density of the optical field can be enhanced up to $10^5$ times, which enables a detectable mode shift signal associated with a small change in the optical refractive index caused by temperature changes.

In various embodiments, the diameter of optical microsphere ranges from several microns to tens of microns, or ranging from 1 µm±0.5 um to 100 µm±0.5 um. At these dimensions, the optical microsphere thermal sensor is a point sensor. As a result, the spatial sensing resolution is improved, and the sensor can be used to accurately measure local temperature perturbation.

The optical microsphere may be batch manufactured by methods of cooling liquid injection or congealing solution-gel.

In some aspects, the beam expander may be provided in the form of a fiber mat. The combination of the focusing lens 32, the beam expander 31, and the nanoscatterer 35 on the microspheres enables bidirectional coupling of the optical energy between the transmitting fiber and the microsphere.

In other aspects, the beam expander may be an optical fiber tube. In other additional aspects, the focusing lens may be a gradient-index lens.

In various embodiments, the incident light beam emitted from the end face of the optical fiber propagates in the air of the beam expander. The beam size of the incident light beams is expanded to a size close to the aperture of the gradient-index lens. The expanded incident beam is then focused by the gradient-index lens onto the microsphere. The focused laser beam is further focused by the microsphere itself onto the nanoscatterer located at the back surface of the microsphere. The nanoscatterer scatters the incident light to the surrounding microsphere surface. Because of Purcell effect, most of the light scattered by the nanoscatterer is coupled into the resonant mode when the frequency of the incident light matches with the resonant frequency of a WGM. Meanwhile, after scattering by the nanoscatterer, the resonant optical field can also propagate in the reversed optical path, passing through the same gradient-index lens and fiber, and eventually be detected by a photodetector for data processing as described below.

In various embodiments, the proposed WGM thermal probe may function as described below and as illustrated in FIGS. 1A, 1B, and 1C. An incident light beam from the end face of the optical fiber 2 propagates in the air of the beam expander 31, whose beam size is extended close to the aperture of the gradient-index lens 32. The extended incident beam is then focused by the gradient-index lens 32 onto the microsphere 34. Remarkably, the focused laser beam is further focused by the microsphere 34 itself onto the nanoscatterer 35 located at the back surface of the microsphere 34, which scatters the incident light to the surrounding. Most of the light scattered by the nanoscatterer 35 is coupled into the resonant mode with the help of Purcell effect when the frequency of the incident light matches with the resonant frequency of a WGM. Meanwhile, the resonant optical field can also be coupled out of the cavity 34 by the same nanoscatterer 35 in the reversed optical path, collected by the same gradient-index lens 32 and fiber 2, and finally detected by the photodetector for analyzing.

In various embodiments, an optical WGM fiber thermal probe is based on a single-port far-field coupling system. The far-field mode coupling efficiency can be improved by a combination of Rayleigh scattering, spherical cavity focusing and gradient-index lens. Both the incident beam and collected sensing signals propagate through the same port, including, but not limited to, an optical fiber 2 as illustrated in FIG. 1A. The sensing signals are coupled back into the fiber and subsequently transmitted to the signal processing system. The scattering coupling efficiency is improved by using a secondary focusing of the microsphere. The overall scattering coupling efficiency of the system is improved from 1% to 16.8% in some aspects. Further, because the use of single port and the microsphere being positioned at the end of the fiber port, the probe system is suitable for being used as a sensing probe.

In various embodiments, as shown in FIGS. 1A, 1B and 1C, a highly sensitive thermal sensor comprises a microsphere, optical fiber 2, fiber optic connector 1, and probe 3. Fiber connector 1 optically couples fiber 2 with other lines carrying optical signals. The probe is used for temperature sensing. Fiber 2 comprises a fiber core 21 for light transmission. Probe 3 includes beam expansion apparatus 31, gradient-index lens 32 and microsphere 34. Microsphere 34 is located at the focus of focusing lens 32. The probe system further comprises a nanoscatterer 35. The cross-sections of 32 and 31 may be rectangular in some aspects. The microsphere 34 may be located at the front of probe 3 in some aspects. The beam expander 31 may be disposed between 32 and fiber 2 in some aspects.

In various aspects, the microsphere may be used as a sensor. The resonant frequency of the microsphere shifts as temperature changes. The microsphere may comprise silica. Silica's refractive index is a function of temperature. Because WGM modes locate around the surface of microsphere, the resonant frequency of microsphere depends on its refractive index. Temperature change, therefore, affects the resonant frequency through changes in refractive index.

The advantage of using the microsphere as a temperature sensor includes high sensitivity, easy positioning, short response time, and low cost. A factor that affects the sensitivity of the probe system is the intensity of the interaction between light and photon, where the interaction intensity relates to the light power.

Microsphere 34 has good quality/mode volume. As a result, the input can be enhanced $10^5$ times. The smallest dimension of the probe system disclosed herein can reach ten micrometers. Typical existing temperature sensors are 3D sensors. Some thin film sensor are 2D sensors. Bragg grating function as 1D sensors. The sensor comprising the probe system disclosed herein is 0D point sensor.

In various aspects, the diameter of microsphere 34 ranges from about 10 micron to about 100 microns. As a point sensor, the microsphere can enhance the spatial resolution and it can easily locate local temperature change. Furthermore, it has short response time. Finally, the cost of the probe system is low because silica microspheres can be easily and cheaply made.

Nanoscatterer 35 scatters light in various aspects. Because of Purcell effect, most of scattered light will couple into the resonator when the input frequency matches with the resonant frequency of the microsphere.

The beam expansion apparatus 31 is a fiber tube, and the focused lens 32 is a gradient-index lens. Beam expander 31, focusing lens 32, and nanoscatterer 35 are used to couple fiber and the microsphere. Probe end 33 may be formed from a low refractive index optical glue in some aspects. The probe end 33 may affix the gradient-index lens 32, microsphere 34 and nanoscatterer 35 in a fixed arrangement in some aspects.

The following example describes a fiber-based whispering-gallery-mode (WGM) microprobe, combining both the high optical field enhancement of the WGMs and the practicability of the fiber probe, which is highly demanded in sensing and imaging. As described herein, the efficient far-field coupling of WGMs by scattering the focused laser beam through a nanotip is experimentally reported. With the help of Purcell effect as well as the two-step focusing technique, a WGM excitation efficiency as high as 16.8% was achieved. Both the input and output of the probe light propagate along the same fiber, which makes the whole coupling system a fiber-based WGM microprobe for sensing/imaging applications.

EXAMPLES

The following non-limiting examples are provided to further illustrate the present disclosure. It should be appreciated by those of skill in the art that the techniques disclosed in the examples that follow represent approaches the inventors have found function well in the practice of the present disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the present disclosure.

Example 1: A Whispering-Gallery-Mode Sensing Probe

The following example describes a new scattering-assisted whispering gallery mode sensing probe developed by combining a microsphere, a nanoscatterer on the surface of the sphere, a fiber and a GRIN lens.

A fiber-based sensing probe is provided, which can achieve far-field coupling of WGMs by scattering the focused laser beam through a nanotip. The fiber-based probe is composed of a fiber coupler (1), a single mode fiber (2), and a probe (3), as shown in FIG. 2A. The probe is composed of a beam expander (31), a fiber lens (321), and a microsphere (34), which may be held together by low refractive-index optical glue (33), as shown in FIG. 2B. There is a PS nanoparticle (35) glued on the surface of the microsphere. The focused probe light is further focused on the PS nanoparticle by the microsphere itself. With the help of Purcell effect, a WGM excitation efficiency as high as 16.8% has been achieved. Due to the reversibility of light, the WGM signal can also be scattered by the same nanoparticle, and collected by the same fiber coupler. The fiber-based WGM probe opens up a new direction for a variety of sensing/imaging applications, such as nanoparticle/biomolecule sensing, resonant acoustic imaging, and in-situ monitoring of dynamic chemical reactions. It also provides a new type of probe for endoscopic sensing.

Example 2. The Coupling Process and the Spectrum

In one aspect, referring to FIG. 2A, a probe system comprises a tunable laser, a circulator, a fiber coupled GRIN lens, a microsphere resonator with a diameter of 35 µm, a fiber nanotip with a diameter of around 0.2 µm at the top, and a photodetector. The probe laser in 1,550 nm wavelength band is first coupled into the fiber and then focused onto the surface of the microsphere by the GRIN lens with a working distance of 200 µm. A two-step focusing technique is used, in which the focused laser beam with a size of around 6µ m is further focused by the microsphere itself onto the nanotip located at the back surface of the microsphere. Most of the light scattered by the nanotip is coupled into the resonant mode with the help of Purcell effect when the incident light is scanned across a WGM. The incident light coupled equally to the clockwise (CW) and counter-clockwise (CCW) modes benefitting from the Rayleigh scattering of the nanotip. Meanwhile, the cavity mode field was also coupled out of the cavity by the same nanotip in the reversed optical path and then collected by the same GRIN lens and fiber. Finally, the collected reflection signal was routed by the circulator and detected by the photodetector, which was connected with an oscilloscope to monitor the back-scattering spectrum of the resonant system. In the experiments, three 3-axis nano-stages were used to control the relative positions of the microsphere, the nanotip, and the incident laser beam to adjust the coupling condition.

FIG. 2A shows a schematic illustration of the experimental setup. TL: tunable laser, PD: photo-detector, CL: circulator, GRIN LENS: graded-index lens, MS: microsphere, NT: fiber nanotip. Inset: an optical image of a microsphere and a fiber nanotip in the experiment. (b) Reflection spectra with and without a nanotip. (c) Optical spectra of the scatterer-assisted coupling and the fiber taper coupling.

A typical reflection spectrum is shown as the black curve in FIG. 2B. As a comparison, the red curve in FIG. 2B shows the reflection spectrum when the nanotip is removed from the surface of the microsphere, and the resonant peaks disappear subsequently. The resonant peaks are caused by the Rayleigh scattering of the nanotip. Note that the doublet peak exhibits a clear mode splitting, which is caused by the mode coupling of the CW and CCW modes induced by the scattering of the nanotip. It further proves the role of the nanotip in the Rayleigh scattering. In other words, the nanotip in the coupling system not only couples resonant light into and out of WGMs of the microsphere but also provides mode coupling between the CW and CCW modes. Moreover, this coupling mechanism is free from the phase-matching condition, and applies to all the modes in the microsphere. As shown in FIG. 2C, there are five spikes in the reflection spectrum, showing the same frequencies with resonant dips in the transmission spectrum, which is obtained by the traditional fiber taper coupling method. It is worth noting that some modes are not excited by the nanotip, which can be attributed to the mismatching between the mode distributions and the location of the nanotip.

An overall coupling efficiency of 2.8% is derived from the measured reflection signal peak power divided by the input probe power. Note that the overall coupling efficiency includes both the input and the output coupling processes, which are two reversible processes and thus should have the same coupling efficiency. Therefore, the coupling efficiency of the proposed coupling method is the square root of the overall coupling efficiency, i.e., 16.8%. The high scattering-based coupling efficiency is attributed to both Purcell effect and the proposed two-step focusing technique.

Example 3. Coupling Efficiencies as a Function of the Positions of the Lens

Figure 3:
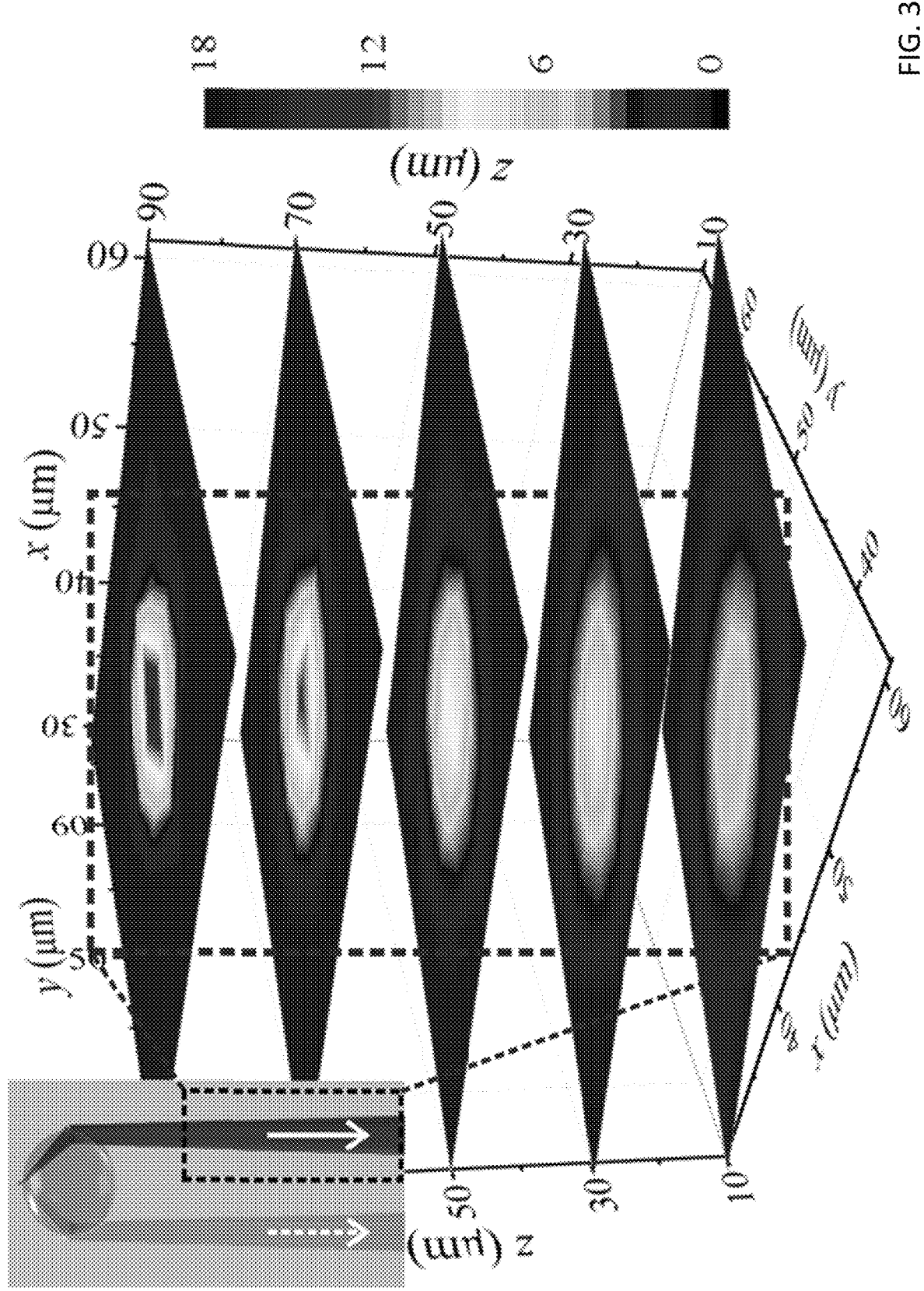
FIG. 3 is measured three-dimension nanotip induced emission pattern.

The free-space coupling efficiency is typically determined by the beam matching between the resonant emission pattern and the incident probe laser beam. To obtain a higher coupling efficiency, the free-space Gaussian beam may be engineered to have a better overlap with the nanotip induced emission pattern, including both the divergence angle and the coupling position. To measure the divergence angle of the nanotip induced emission pattern, the resonant mode is excited by a tapered fiber and the 3-dimension emission pattern is measured by moving the 3-axis nano-stage, where the GRIN lens is mounted, as shown in FIG. 3.

A divergence angle of 4.18° is obtained by fitting the focused profile of the emission pattern. In the experiment, a GRIN lens with a working distance of around 200 µm is utilized to focus the probe laser beam down to around 6 µm. The divergence angle of the focused beam is about 3.27°, which is similar with that of the emission divergence.

Figure 4A:
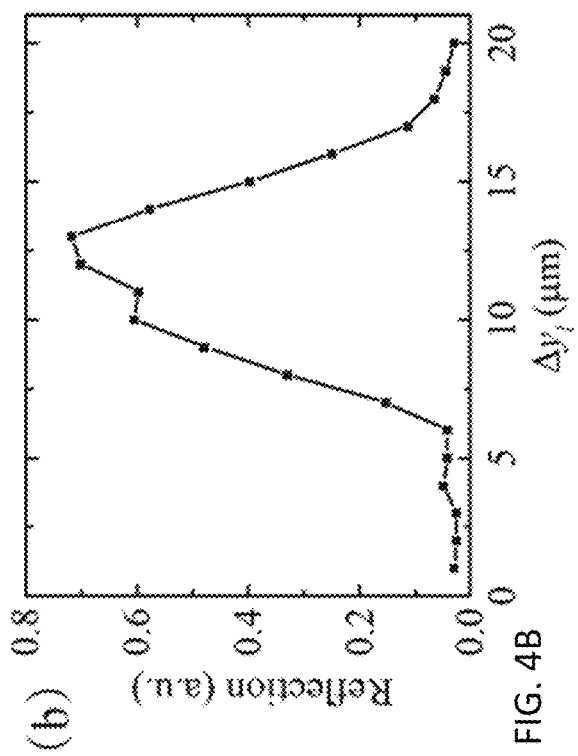
FIG. 4A is reflection spectrum versus the relative position $\Delta x_i$ between the probe laser beam and the microsphere.
Figure 4C:
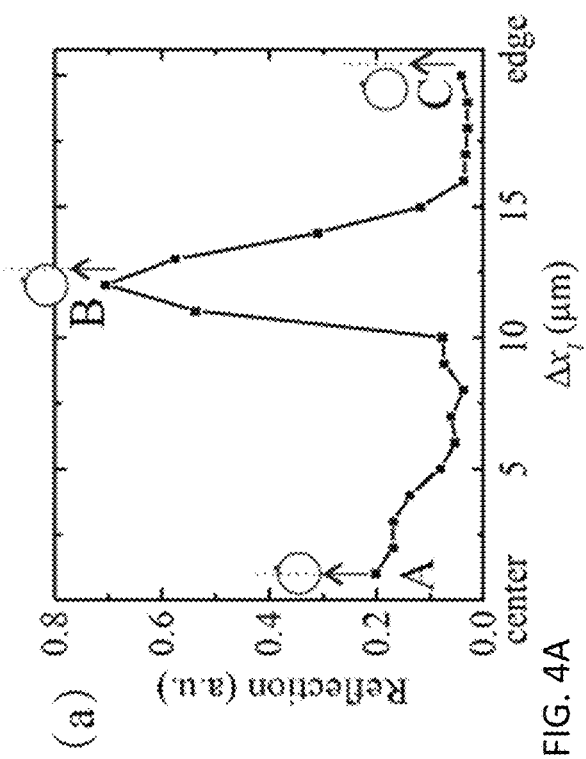
FIG. 4C is reflection spectrum versus the relative position $\Delta z_i$ between the probe laser beam and the microsphere.
Figure 4B:
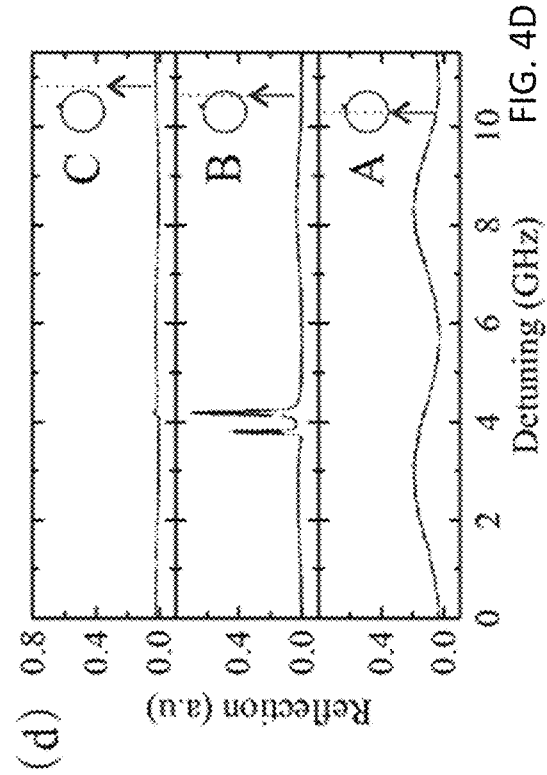
FIG. 4B is reflection spectrum versus the relative position $\Delta y_i$ between the probe laser beam and the microsphere.
Figure 4D:
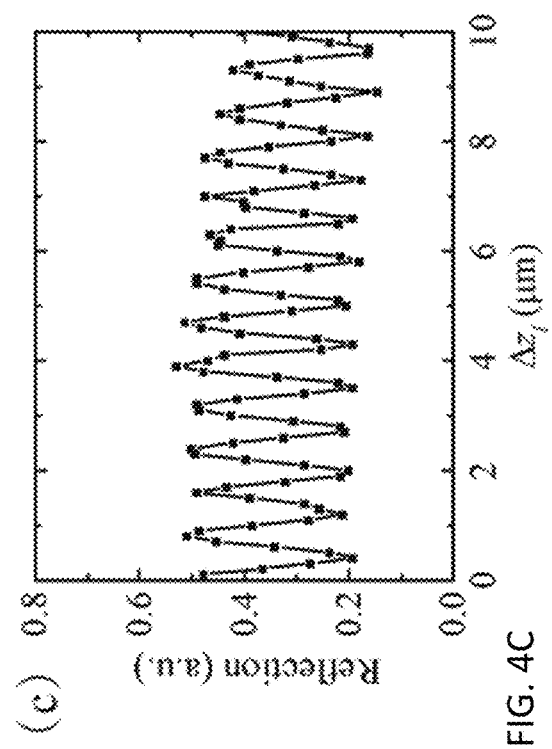
FIG. 4D is reflection spectra at three positions of x.

To study the dependence of the coupling position, the GRIN lens, the microsphere, and the nanotip are mounted on three 3-axis nano-stages, respectively. By moving the GRIN lens solely, the variation of coupling efficiencies of a Q=5.6× $10^6$ mode with the position of the incident light was investigated (FIGS. 4A, 4B, 4C, and 4D), with the coordinate system defined in FIG. 2(a). In FIGS. 4A, 4B, and 4C, peaks of reflection spectrum vary with the relative position $\Delta x_i$ (a), $\Delta y_i$ (b), and $\Delta z_i$ (c) of the GRIN lens (incident beam) when keeping the nanotip-sphere coupling system invariant. FIG. 4D shows reflection spectra at three positions of x.

The maximum reflection intensities, which indicate the coupling efficiencies, as a function of the relative x and y between the probe laser beam and the microsphere, are shown in FIGS. 4A and 4B, respectively.

Reflection peaks exist when adjusting both x and y positions of the GRIN lens. The widths of the peaks at the half height are 3.2 µm and 7.1 µm for the relative x and y, respectively. The coupling system has a position tolerance of about 2 to 4 times of the wavelength in the lateral plane. Note that the y related width is more than two times of that in the x direction, which is because the nanotip is a scatterer with a larger dimension in the y direction than in the x direction. Different from x and y positions, there is a periodic oscillation of the reflection signal with varied z position, as shown in FIG. 4C. The period of the oscillation is about 0.77 µm, which is the half of the probe light wavelength. This oscillation stems from the interference between the reflected light from the end-face of the GRIN lens and the resonant emission of the microsphere. The average reflection signal decreases less than 20% in a range of 10 µm, showing a very large position tolerance in the z direction. It is worth noting that the x-related curve is asymmetric in FIG. 4A, which is attributed to the non-resonant reflection of the microsphere. Specifically, at the position A, where the input light aims at the center of the microsphere, the non-resonant reflection of the probe light by the microsphere can be collected by the coupling lens, then forms a high reflection background, as shown in the frequency-scanning curve in FIG. 4D. While at the position C, where the probe beam is far away from the microsphere, neither resonant nor non-resonant light can be reflected.

Example 4. Coupling Efficiencies as a Function of the Positions of the Nanotip and the Microsphere The coupling efficiency varying with the relative position of the nanotip on the equator of the microsphere is investigated. The experiment is performed by moving both the nanotip and the microsphere in the x axis with the incident laser beam focused. More specifically, the microsphere moves with a step of 2 µm. For every position of the microsphere, the nanotip is moved along the equator of the microsphere in the x-z plane continuously and record both the top-view imaging by a CCD camera and the reflection spectrum with a frame rate of ~3 Hz.

Figure 5B:
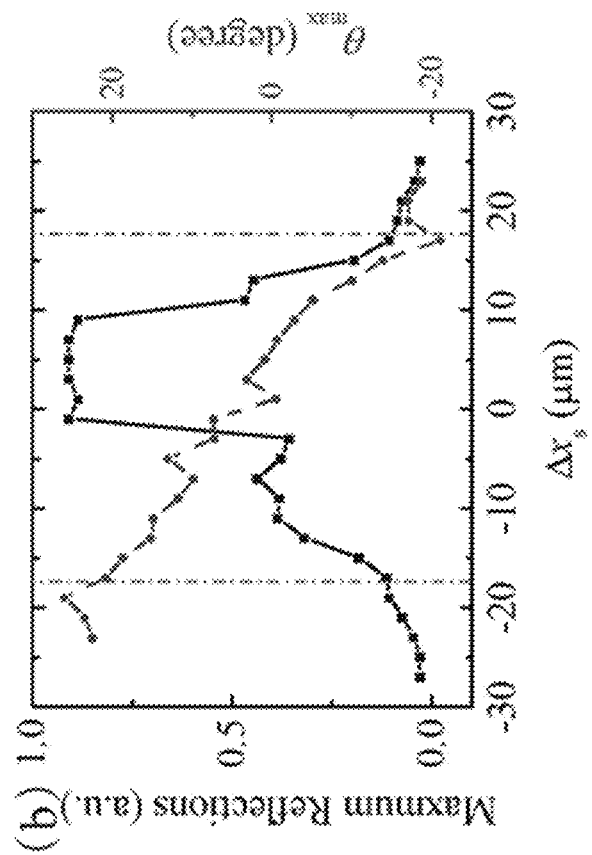
FIG. 5B is the maximum peak value in the reflection spectrum (black solid curve) and the corresponding position $\theta$ of the nanotip versus the coordinate of the sphere $\Delta x_s$.
Figure 5A:
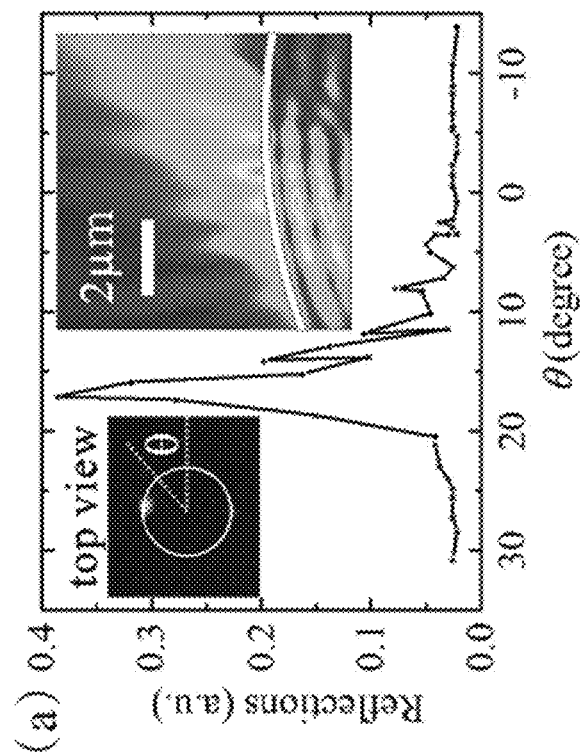
FIG. 5A is reflection spectrum versus the position $\theta$ of the nanotip with $\Delta x_s = -11$ μm.

The position of the nanotip on the microsphere is indicated by a polar coordinate, θ, in the x-z plane, as defined in the left inset of FIG. 5A. Specifically, when the nanotip is near or on the equator of the microsphere, a light spot caused by the resonant scattering of a illumination light can be imaged in the top view, which can help to mark the position of the nanotip, θ. Meanwhile, the reflection signal, which corresponds to the coupling efficiency of every nanotip position, is acquired by a photodetector. FIG. 5A shows the reflection as a function of the nanotip position with the microsphere fixed at $\Delta x_s = -11$ μm, where a main peak accompanied with several side lobes is presented. The width of the main peak is about 3 degree which corresponding to 0.9 μm. A 2-dimension simulation with a Gaussian beam focused by a microsphere is performed to explain the fringes. The simulated field distribution around the rim of the microsphere is shown in the right inset of FIG. 5A, where several fringes can be clearly seen on the surface of the microsphere. Note that the size of the nanotip (~0.2 μm) is much smaller than the period of the fringes (~1 μm). Thus the fringes can be resolved by the nanotip moving along the ring of the spherical resonator. In addition, the fluctuation of the coupling efficiency maps the distribution of the intensity of the focused field, which further verifies that the resonant coupling is caused by the nanotip.

FIG. 5A shows peak value of the reflection varies with the position of the nanotip on the sphere with the microsphere fixed at $\Delta x_s = -11$ μm. Left inset: a top view of the sphere-tip coupling system. Right inset: the simulated distribution of a Gaussian beam focused by the microsphere. (b) Maximum peak value in the reflection spectrum (black solid curve) and the corresponding position of the nanotip (blue dashed curve) vary with the coordinate of the sphere, $\Delta x_s$, when the incident beam is fixed. The vertical red dot dashed lines indicate the boundaries of the microsphere at $\Delta x_s = 0$ μm.

In the experiment, for every position of the microsphere, the maximum reflection as well as the corresponding azimuth angle $\theta_{max}$ are recorded, as shown in the black and blue curves in FIG. 5B, respectively. The two vertical red dot-dash lines mark the two edges of the microsphere. A relatively high coupling efficiency can be achieved in a large range of ~15 μm, in what scope the most energy of the incident Gaussian beam illuminates on the microsphere. It is worth noting that the reflection curve deviates from the mirror symmetry relative to the center of the microsphere ($\Delta x_s$~0). This deviation may be attributed to the misalignment between the incident Gaussian beam and the z axis. In addition, there is also a dip at $\Delta x_s$~−3 μm, which is because the coupling efficiency is recorded by the maximum intensities in the reflection spectrum of the doublet peak structure (see FIG. 2B). In most cases one peak in the doublet is much higher than the other one, and then the maximum intensities well represents the coupling efficiencies of the splitting mode. However, the doublet peaks have nearly equal height at $\Delta x_s$~−3 μm, and therefore a much smaller apparent coupling efficiency is achieved. The azimuth angle $\theta_{max}$ shows an approximate linear relationship with Δxs (blue curve in FIG. 5B). A same deviation respect to the center appears in the curve, which is also caused by the misalignment of the Gaussian beam.

Definitions and methods described herein are provided to better define the present disclosure and to guide those of ordinary skill in the art in the practice of the present disclosure. Unless otherwise noted, terms are to be understood according to conventional usage by those of ordinary skill in the relevant art.

In some embodiments, numbers expressing quantities of ingredients, properties such as molecular weight, reaction conditions, and so forth, used to describe and claim certain embodiments of the present disclosure are to be understood as being modified in some instances by the term "about." In some embodiments, the term "about" is used to indicate that a value includes the standard deviation of the mean for the device or method being employed to determine the value. In some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable. The numerical values presented in some embodiments of the present disclosure may contain certain errors necessarily resulting from the standard deviation found in their respective testing measurements. The recitation of ranges of values herein is merely intended to serve as a shorthand method of referring individually to each separate value falling within the range. Unless otherwise indicated herein, each individual value is incorporated into the specification as if it were individually recited herein.

In some embodiments, the terms "a" and "an" and "the" and similar references used in the context of describing a particular embodiment (especially in the context of certain of the following claims) can be construed to cover both the singular and the plural, unless specifically noted otherwise. In some embodiments, the term "or" as used herein, including the claims, is used to mean "and/or" unless explicitly indicated to refer to alternatives only or the alternatives are mutually exclusive.

The terms "comprise," "have" and "include" are open-ended linking verbs. Any forms or tenses of one or more of these verbs, such as "comprises," "comprising," "has," "having," "includes" and "including," are also open-ended. For example, any method that "comprises," "has" or "includes" one or more steps is not limited to possessing only those one or more steps and can also cover other unlisted steps. Similarly, any composition or device that "comprises," "has" or "includes" one or more features is not limited to possessing only those one or more features and can cover other unlisted features.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the present disclosure and does not pose a limitation on the scope of the present disclosure otherwise claimed. No language in the specification should be construed as indicating any non-claimed element essential to the practice of the present disclosure.

Groupings of alternative elements or embodiments of the present disclosure disclosed herein are not to be construed as limitations. Each group member can be referred to and claimed individually or in any combination with other members of the group or other elements found herein. One or more members of a group can be included in, or deleted from, a group for reasons of convenience or patentability. When any such inclusion or deletion occurs, the specification is herein deemed to contain the group as modified thus fulfilling the written description of all Markush groups used in the appended claims.

All publications, patents, patent applications, and other references cited in this application are incorporated herein by reference in their entirety for all purposes to the same extent as if each individual publication, patent, patent application or other reference was specifically and individually indicated to be incorporated by reference in its entirety for all purposes. Citation of a reference herein shall not be construed as an admission that such is prior art to the present disclosure.

Having described the present disclosure in detail, it will be apparent that modifications, variations, and equivalent embodiments are possible without departing the scope of the present disclosure defined in the appended claims. Furthermore, it should be appreciated that all examples in the present disclosure are provided as non-limiting examples.

In operation, a computer executes computer-executable instructions embodied in one or more computer-executable components stored on one or more computer-readable media to implement aspects of the invention described and/or illustrated herein.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention.

Embodiments of the invention may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A microprobe comprising:
a microsphere optical resonator comprising a back surface and a front surface opposite the back surface;
a nanoscatterer operatively coupled to the microsphere optical resonator;
a focusing lens operatively coupled to the microsphere optical resonator at a focal point of the focusing lens; and
a beam expander operatively coupled to the focusing lens, wherein:
the beam expander is configured to receive a laser beam, expand a beam size of the laser beam, and provide the laser beam with the expanded beam size to the focusing lens,
the focusing lens is configured to focus the laser beam to produce a focused laser beam and to direct the focused laser beam into the microsphere optical resonator at the front surface, and
the front surface of the microsphere optical resonator is configured to receive a focused laser beam and the nanoscatterer is positioned adjacent to the back surface.

2. The microprobe of claim 1, wherein the focusing lens is a GRIN lens.

3. The microprobe of claim 1, further comprising an optical fiber comprising a first end and a second end, the first end operatively coupled to the beam expander, the optical fiber configured to direct the laser beam through the beam expander and into the focusing lens and to collect a reflection signal produced by the microsphere optical resonator.

4. The microprobe of claim 3, wherein the microsphere optical resonator further comprises a resonant frequency and wherein the reflection signal is enhanced when a frequency of the focused laser beam is essentially matched to the resonant frequency of the microsphere optical resonator.

5. The microprobe of claim 3, wherein the nanoscatterer is selected from the group consisting of a fiber nanotip and a nanoparticle.

6. The microprobe of claim 5, wherein the nanoparticle is affixed to the back surface of the microsphere optical resonator.

7. The microprobe of claim 6, wherein the nanoparticle is a polystyrene nanoparticle.

8. The microprobe of claim 1, wherein the microsphere optical resonator comprises a silica microsphere.

9. The microprobe of claim 8, wherein the microsphere optical resonator further comprises a diameter ranging from about 10 microns to about 100 microns.

10. The microprobe of claim 1, wherein the beam expander is configured to expand the beam size of the laser beam to about a size of an aperture of the focusing lens.

11. A thermal microprobe comprising:
a microsphere optical resonator comprising a back surface and a front surface opposite the back surface;
a nanoscatterer operatively coupled to the microsphere optical resonator; and
a focusing lens operatively coupled to the microsphere optical resonator at a focal point of the focusing lens;
a beam expander operatively coupled to the focusing lens, wherein:
the beam expander is configured to receive a laser beam, expand a beam size of the laser beam, and provide the laser beam with the expanded beam size to the focusing lens,
the focusing lens is configured to focus the laser beam to produce a focused laser beam and to direct the focused laser beam into the microsphere optical resonator at the front surface, and
the front surface of the microsphere optical resonator is configured to receive a focused laser beam and the nanoscatterer is positioned adjacent to the back surface.

12. The thermal microprobe of claim 11, further comprising an optical fiber comprising a first end and a second end, the first end operatively coupled to the beam expander, the optical fiber configured to direct the laser beam through the beam expander and into the focusing lens and to collect a reflection signal produced by the microsphere optical resonator.

13. The thermal microprobe of claim 12, wherein the microsphere optical resonator comprises a silica microsphere with a diameter ranging from about 10 microns to about 100 microns.

14. The thermal microprobe of claim 12, wherein the microsphere optical resonator, the nanoscatterer, and the focus lens are mutually affixed to maintain constant relative positions using a low-refractive index optical glue.

15. The thermal microprobe of claim 12, wherein the microsphere optical resonator further comprises a resonant frequency, the reflection signal is enhanced when a frequency of the focused laser beam is essentially matched to the resonant frequency of the microsphere optical resonator, and the resonant frequency of the microsphere optical resonator varies as a function of a temperature of the microsphere optical resonator.

16. The thermal microprobe of claim 11, wherein the nanoscatterer is a nanoparticle is affixed to the back surface of the microsphere optical resonator.

17. The thermal microprobe of claim 11, wherein the beam expander is configured to expand the beam size of the laser beam to about a size of an aperture of the focusing lens.

18. A method for measuring a temperature using a thermal microprobe, the method comprising:
providing the thermal microprobe, the thermal microprobe comprising a microsphere optical resonator operatively coupled to a nanoscatterer, a focusing lens operatively coupled to the microsphere optical resonator at a focal point of the focusing lens, a beam expander operatively coupled to the focusing lens, and an optical fiber comprising a first end and a second end, the first end operatively coupled to the beam expander;
directing a laser beam into the second end of the optical fiber;
expanding a beam size of the laser beam by directing the laser beam from the first end of the optical fiber to the beam expander;
producing a focused laser beam by directing the laser beam from the beam expander to the focusing lens;
directing the focused laser beam into the microsphere optical resonator using the focusing lens;
collecting a reflection signal from the microsphere optical resonator using the optical fiber; and
determining a resonant frequency of the microsphere optical resonator based on a frequency of the laser beam at which the reflection signal is a maximum, wherein the resonant frequency is indicative of the temperature.

19. The method of claim 18, further comprising:
focusing the focused laser beam from the focusing lens onto the nanoscatterer using the microsphere optical resonator;
scattering the focused laser beam at the nanoscatterer;
receiving the scattered laser beam at the microsphere optical resonator; and
producing the reflection signal from the scattered laser beam.

20. The method of claim 18, wherein expanding a beam size of the laser beam by directing the laser beam from the first end of the optical fiber to the beam expander comprises expanding a beam size of the laser beam to about a size of an aperture of the focusing lens.

* * * * *